US012680202B2

(12) United States Patent
Bahukudumbi et al.

(10) Patent No.: US 12,680,202 B2
(45) Date of Patent: Jul. 14, 2026

(54) PROTECTIVE FABRIC RESISTANT TO MOLTEN METAL SPLASH

(71) Applicant: J. & P. Coats, Limited, Uxbridge (GB)

(72) Inventors: Pradipkumar Bahukudumbi, Uxbridge (GB); Fatih Cetin, Uxbridge (GB); Erkan Ekici, Uxbridge (GB)

(73) Assignee: J. & P. Coats, Limited, Uxbridge (GB)

( * ) Notice: Subject to any disclaimer, the term of this patent is extended or adjusted under 35 U.S.C. 154(b) by 432 days.

(21) Appl. No.: 17/790,845

(22) PCT Filed: Jan. 6, 2021

(86) PCT No.: PCT/US2021/012312
§ 371 (c)(1),
(2) Date: Jul. 5, 2022

(87) PCT Pub. No.: WO2021/141990
PCT Pub. Date: Jul. 15, 2021

(65) Prior Publication Data

US 2023/0045496 A1 Feb. 9, 2023

Related U.S. Application Data

(60) Provisional application No. 62/957,397, filed on Jan. 6, 2020.

(51) Int. Cl.
*D03D 15/513* (2021.01)
*A62B 17/00* (2006.01)
(Continued)

(52) U.S. Cl.
CPC ............. *D03D 15/513* (2021.01); *D02G 3/04* (2013.01); *D02G 3/443* (2013.01); *D03D 1/0035* (2013.01);
(Continued)

(58) Field of Classification Search
CPC .................... D02G 3/04; D02G 3/443; D10B 2201/00-30; D10B 231/022;
(Continued)

(56) References Cited

U.S. PATENT DOCUMENTS 5,759,207 A * 6/1998 Green ................ D06M 15/431 442/143
7,259,117 B2 8/2007 Mater et al.
(Continued)

FOREIGN PATENT DOCUMENTS

| | | | |
|---|---|---|---|
| CN | 1564890 | A | 1/2005 |
| WO | 2017070529 | A1 | 4/2017 |
| WO | 2018148399 | A1 | 8/2018 |

OTHER PUBLICATIONS

Int'l Search Reported for PCT/US2021/012312, dated Apr. 23, 2021.

*Primary Examiner* — Larissa Rowe Emrich
(74) *Attorney, Agent, or Firm* — MaxGoLaw PLLC

(57) ABSTRACT

Flame resistant fabrics are provided that exhibit improved protection from molten metal spills, metal splatter, electric arc, and related thermal hazards illustratively including open flame and radiant heat. The flame resistant fabrics are made from a combination of cellulosic fibers and thermoplastic fibers, where the flame resistant fabric forms a char layer that does not become brittle when contacted by molten metal, metal splatter, electric arc, and related thermal hazards. By not becoming brittle the likelihood of break out of the fabric is minimized, thereby improving the level of protection to the user. As a result, the flame resistant fabric retains the desirable properties of fibers formed of organic materials in terms of comfort, weight, and durability.

19 Claims, 10 Drawing Sheets

(51) Int. Cl.

| | |
|---|---|
| ***D02G 3/04*** | (2006.01) |
| ***D02G 3/44*** | (2006.01) |
| ***D03D 1/00*** | (2006.01) |
| ***D03D 15/225*** | (2021.01) |
| ***D03D 15/283*** | (2021.01) |
| ***D03D 15/47*** | (2021.01) |

(52) U.S. Cl.
CPC ......... *D03D 15/225* (2021.01); *D03D 15/283* (2021.01); *D03D 15/47* (2021.01); *A62B 17/003* (2013.01); *D10B 2201/30* (2013.01); *D10B 2401/041* (2013.01); *D10B 2403/0112* (2013.01)

(58) Field of Classification Search
CPC ....... D10B 2331/02–021; D10B 2331/04–042; D10B 2331/061; D10B 2331/301; D03D 1/0035; D03D 15/513; A41D 13/00; A41D 13/0002
See application file for complete search history.

(56) References Cited

U.S. PATENT DOCUMENTS

| | | | | |
|---|---|---|---|---|
| 2009/0019624 | A1* | 1/2009 | Birk | D02G 3/04 2/81 |
| 2009/0178187 | A1* | 7/2009 | Nelson | D03D 15/267 139/420 R |
| 2013/0022805 | A1* | 1/2013 | Small, Jr. | D04B 21/165 428/220 |
| 2018/0057973 | A1 | 3/2018 | Yang | |
| 2019/0242038 | A1* | 8/2019 | Stanhope | D03D 15/225 |

* cited by examiner

| ATPV | 8,5 cal/cm² |
|---|---|

| Probability % | 5 | 10 | 20 | 30 | 40 | 50 | 60 | 70 | 80 | 95 |
|---|---|---|---|---|---|---|---|---|---|---|
| $E_i$ cal/cm² | 6,7 | 7,2 | 7,7 | 8,0 | 8,2 | 8,5 | 8,7 | 9,0 | 9,3 | 10,2 |

| | |
|---|---|
| ATPV points above | 9 |
| ATPV points 20% | 14 |
| ATPV points below | 4 |
| ATPV points mix zone | 8 |

| HAF | 77,7 % |
|---|---|

| | |
|---|---|
| % HAF value : | 77,7 |
| Upper Confidence Level %: | 78,5 |
| Lower Confidence Level %: | 76,9 |
| Points above: | 7 |
| Points below: | 8 |
| Points between: | 6 |
| Total Points: | 21 |

PROTECTIVE FABRIC RESISTANT TO MOLTEN METAL SPLASH

CROSS REFERENCE TO RELATED APPLICATIONS

This application claims priority benefit of U.S. Provisional Application Ser. No. 62/957,397 filed 6 Jan. 2020, the contents of which are hereby incorporated by reference.

FIELD OF THE INVENTION

The present invention in general relates to flame resistant fabric, and in particular to protective fabric that is resistant to molten metal splash.

BACKGROUND OF THE INVENTION

Flame resistance (FR) is a characteristic of a material such as a fiber or fabric that does not burn in a normal air atmosphere. When exposed to a flame, flame resistant materials will not support combustion when the flame is removed.

Protective suits and garments are made using flame resistant fibers and fabric for use in situations that require protection from open flames or sources of heat. For example, fire fighters wear garments that protect the user from flames when responding to fires or hazardous situations. Flame resistant garments are expected to prevent direct exposure to flames of the clothed user's skin, thereby reducing the risk of suffering burn injuries. In addition to first responders and public safety officers, other professions require protective clothing from hazardous heat sources. Critical requirements of such protective clothing are that the fabric must be flame resistant so that it will not ignite and continue to burn when the heat source is removed. Also, in the specific instance of exposure to molten metal, the fabric must demonstrate the ability to shed molten metal from its surface without sticking or breaking through the fabric.

Several safety standards have been established to measure comportment with these requirements. These standards include ASTM F1002 (Standard Performance Specification for Protective Clothing and Materials for Use by Workers Exposed to Specific Molten Substances and Related Thermal Hazards, 2015 edition) that establishes the minimum design and performance requirements for protective clothing and protective clothing materials for both primary and secondary protection from exposure to molten substances and related thermal hazards. This standard specifically addresses molten iron, steel, and aluminum.

ISO 11612 (Protective Clothing-Clothing to protect against heat and flame-Minimum performance requirements, 2015 edition) is an international standard that includes, performance requirements for fabrics used in protection against molten metal. Sections 7.4 and 7.5 of ISO 11612 contain specific performance requirements for fabrics used in protection against molten aluminum (code letter D) and molten iron (code letter E), respectively. The fabrics are tested in accordance with ISO 9185 and, based on those results, afforded a performance level rating from D1-D3 (for molten aluminum) and E1-E3 (for molten iron), with a rating of 1 being the worst and a rating of 3 being the best.

NFPA 70E (Standard for Electrical Safety in the Workplace, 2018 edition) offers a method to match protective clothing to potential exposure levels incorporating Personal Protective Equipment (PPE) Categories. Protective fabrics are tested to determine their arc rating, and the measured are rating determines the PPE Category.

For example, protective clothing for molten metal splash protection is used by welders and metal industry workers, while others in the normal course of work are exposed to molten materials that illustratively include tar, glass, and rock. As conventional smelting often relies on electric arc heating, it is often the case that a worker is exposed to an aberrant electric arc that induces molten metal splashes. Aberrant electric arcs can produce harmful radiation, cause intense burns, and can also induce fires. While foundry workers typically wear personal protective equipment for molten metal splash protection, that equipment may not protect against electric arc and related thermal hazards. In contrast, maintenance workers at a foundry typically wear personal protective equipment that offers protection from differing hazards unique to their job, illustratively including aberrant electric arc and related thermal hazards. Foundry maintenance workers often enter the smelting area where they are exposed to multiple hazards such as molten metal splash, electric arc, and related thermal hazards. Before entering an active smelting area of a foundry, maintenance workers must typically change out of their standard personal protective equipment and into personal protective equipment designed to protect against the multiple hazards present in an active smelting area. This results in a complex supply chain for personal protective equipment in that multiple personal protective uniforms are required for foundry personnel depending on what areas of the foundry they must enter. Personal protective uniforms made from flame resistant fabrics that protect against multiple hazards illustratively including molten metal splash, electric arc, and related thermal hazards would simplify the supply chain for personal protective equipment and offer improved and consistent protection to all workers as they transit between various locations that present differing hazards.

Flame resistant materials used in protective clothing are typically breathable for the comfort and to enhance the physical performance of the user, and are designed to endure repeated use. Protective fabrics should have high tear strength, high abrasion resistance, and good resistance to snagging, as well retain their appearance over a prolonged period of use and care. Therefore flame resistant fabrics need to be washable and have good washing stability, low shrinkage, good pilling performance, and good color fastness to washing and light.

There are many flame resistant fabrics that are commercially available. The most widely used in personal protective clothing are (blend ratios are given in % w/w): Flame resistant treated 100% cotton; Flame resistant treated cotton/polyamide blend (typically 85/15); Flame resistant treated polyester/cotton blend (typically 50/50); Modacrylic/cotton blend (typically 55/45); Modacrylic/cotton/aramid blend (typically 25/25/50); Modacrylic/lyocell/aramid blend (typically 25/25/50); 100% meta-aramid; Meta-aramid/para-aramid blend (typically 80/20); Meta-aramid/para-aramid/Anti-static blend (typically 93/5/2); Meta-aramid/FR Modal blend (typically 70/30). Meta-aramid/FR Modal blend (typically 50/50; Meta-aramid/FR Modal blend (typically 35/65)). Inorganic coatings applied to fibers have also been used such as those detailed in U.S. Pat. No. 6,254,810, but at the expense of flexibility and excess weight.

One example commonly used in molten aluminum splash protection is wool blended with FR rayon. Nylon may optionally be incorporated in the fiber blend for durability and abrasion resistance. The wool fibers protect against molten aluminum splash by allowing aluminum to shed off the fabric. However, wool feels relatively harsh on the skin (i.e., is uncomfortable) and is an expensive fiber.

Unfortunately, none of the fabrics currently available are rated as good for metal splash, melt splash, or for electric arc, and only the meta-aramid/FR Modal fabric is rated as good for break out or break open behavior. Break out or break open refers to a complete opening or rupture that develops in a fabric when exposed to the molten metal or electric arc.

Thus, there exists a need for a lightweight fabric that can defeat both molten metal threats and arc-flash induced fire threats while having improved strength, abrasion, and tear properties for improved durability. Such fabrics with improved industrial laundry shrinkage performance are especially desired. There further exists a need for flame resistant protective fabrics that are reversible to extend the useful lifetime of garments made from the flame resistant protective fabrics. There also further exists a need for protective fabrics that are resistant to other molten material splashes of tar, glass, or rock

SUMMARY OF THE INVENTION

A flame resistant fabric is provided that is formed of a combination of cellulosic fibers and thermoplastic fibers having an adherent char layer thereon, where the char is adherent per ASTM D3359-09 Method B. The thermoplastic fiber and the cellulosic fiber are in direct contact between adjacent fibers thereof or the thermoplastic fiber and the cellulosic fiber are separated by a distance of 1 to 3 fiber diameters therebetween. The cellulosic fibers are formed of at least one of cotton, linen, rayon, bamboo, hemp, sisal, jute, or a cellulose ether reaction product of any of the aforementioned.

A process is provided for protecting a volume from a melt. The process includes forming an article from a flame resistant fabric as described above, and exposing the article to a melt, an electric arc, or a combination thereof to form an adherent char on an outer surface of the article. The volume defines equipment and the article is a shield or cover, where the outer surface is enriched in cellulosics relative to an inner surface. The melt includes molten metal, molten glass, molten rock. The article is one of an apron, a cape, a sleeve, a bib, a chap, a coat, a coverall, a glove, a hood, a neck guard, pants, a sleeve, or spats. The article has an arc rating of at least 8.5 cal/cm2 and an arc flash personal protection equipment category rating of 2 per standard NFPA70E Edition 2015 Table 130.7(C)(16).

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1A:
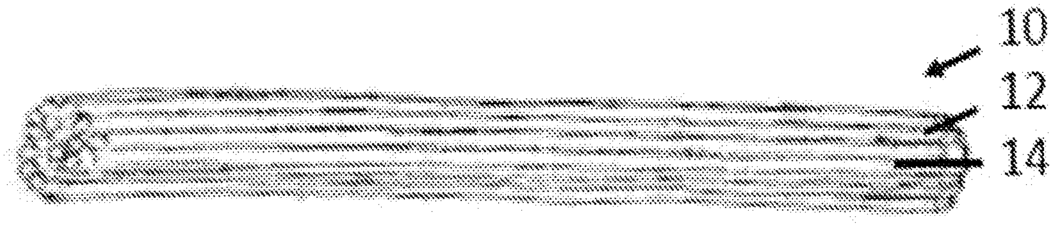
FIGS. 1A-1E are a series of schematics of yarns operative in the present invention to generate a suitable char and include untwisted fiber yarn (FIG. 1A), twisted fiber yarn (FIG. 1B), high bulk fiber yarn (FIG. 1C), stretch fiber yarn (FIG. 1D), and dual layer (FIG. 1E)
Figure 1B:
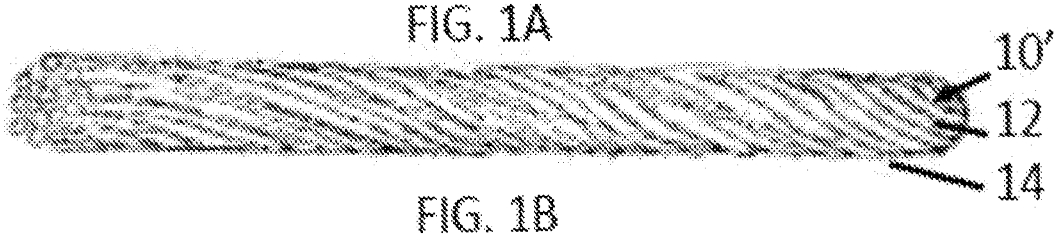
Figure 1C:
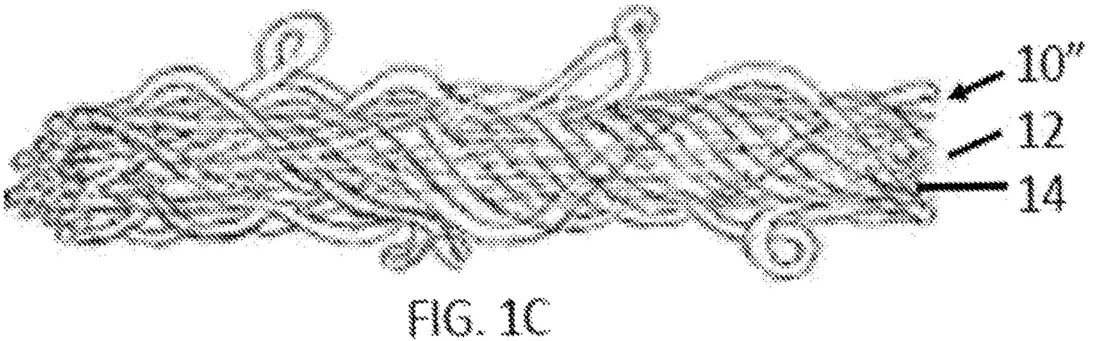

The present invention has utility as flame resistant fabrics that provide improved protection from molten metal spills, metal splatter, electric arc, and related thermal hazards illustratively including open flame and radiant heat. Embodiments of the inventive fabric are made from a combination of cellulosic fibers and thermoplastic fibers. Embodiments of the inventive flame resistant fabric form a char layer that does not become brittle when contacted by molten metal, metal splatter, electric arc, and related thermal hazards. By not becoming brittle the likelihood of break out of the fabric is minimized, thereby improving the level of protection to the user. As a result, embodiments of the inventive fabric retain the desirable properties of fibers formed of organic materials in terms of comfort, weight, and durability.

As a general rule it has been found that fabric weight influences performance. Traditionally, the heavier the fabric, the better the performance. Yet embodiments of the present invention afford a lightweight, durable multi-hazard fabric that can be laundered in an Industrial laundry and is comfortable to wear. Preferred embodiments of the present invention are a wool free blend of fibers.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

It has been surprisingly found that by comingling a cellulosic fiber with a thermoplastic fiber upon exposure to a melt, electric arc, and related thermal hazards that the comingled fiber forms a char that is sufficiently adherent to pass ASTM D3359-09 Method B testing, in contrast to prior art fire resistant fabrics that upon exposure to a melt, electric arc, and related thermal hazards simply fuse and/or burn to compromise the protective nature of the fabric. It has been found that the formation of an adherent char layer upon contact with molten metal makes the molten metal shed off the surface of embodiments of the inventive fabric with no penetration, breakthrough, or holes in the fabric, where embodiments of the fabric are light-weight and are a multi-hazard fabric.

As used herein, a melt is defined as a droplets or a pool of a metal, metal alloy, glass, or rock, having a melt temperature of from 190° C. to 2150° C.

An inventive char layer is formed from thermoplastic fiber proximal to cellulosic fiber in various relative configurations. Thermoplastic fibers operative herein illustratively include disparpolypropylenes, polyamides, polyesters, polyether ether ketones, polybenzobisoxazoles, polyphenylene sulfide; block copolymers containing at least of one of the aforementioned constituting at least 40 percent by weight of the copolymer; and blends thereof.

Cellulosic fibers, synonymously referred to herein as cellulosics, operative herein include cotton, linen, rayon, bamboo, hemp, sisal, jute, and celluolose ether reaction products of any of the aforementioned. As used herein cellulose ethers include methylcellulose (MC), hydroxypropylmethylcellulose (HPMC), hydroxyethylcellulose (HEC) and carboxymethylcellulose (CMC). Suitable cellulosic fibers, include, but are not limited to, natural and synthetic cellulosic fibers (e.g., cotton, rayon, acetate, triacetate, and lyocell, as well as their flame resistant counterparts FR cotton, FR rayon, FR acetate, FR triacetate, and FR lyocell). Examples of rayon fibers include Viscose™ and Modal™ by Lenzing, available from Lenzing Fibers Corporation. An example of an FR rayon material is Lenzing FR™, also available from Lenzing Fibers Corporation, and VISIL™, available from Sateri. Examples of lyocell fibers include TENCEL™, TENCEL G100™ and TENCEL A100™, all available from Lenzing Fibers Corporation. Examples of vinal fibers include Kuralon™ fibers available from Kuraray. The synthesis of cellulose ethers from cellulose is known to the art as detailed in P. Nasatto et al., "Methylcellulose, a Cellulose Derivative with Original Physical Properties and Extended Applications" Polymers 2015, 7, 777-803.

An inventive fabric relies on a char layer being generated that is protective of the thermoplastic fibers relative to the challenge of a contact with a melt, an electric arc, and related thermal hazards. Without intending to be bound to a particular mechanism, it is believed that the cellulosic fiber material combusts with kinetic rapidity relative to the thermoplastic fiber content to generate a char residue that deposits on proximal thermoplastic. The alteration of the surface energy of the fabric with a fluorocarbon finish, minimizes the contact time a molten metal drop will have on the surface, thereby causing the molten metal to roll off the surface, and charring the fabric where the molten metal makes contact. The char being flexible and adherent per ASTM D3359-09 Method B, and either being thermally insulative or having a surface energy that precludes melt wetting of the char thereby causing the melt to run off the fabric before fabric integrity is compromised.

Proximity of thermoplastic fiber to cellulosic fiber is achieved by direct contact between adjacent fibers, or such fibers are separated by a distance of 1 to 3 fiber diameters therebetween. Fibers are in intimate contact given the length of the fibers and the blending process, some portion of cellulosic fibers will always make contact with the thermoplastic fibers. This proximity is achieved through conventional textile manufacture techniques using a yarn that include both thermoplastic fiber and cellulosic fiber content. In an alternative inventive embodiment, a cellulosic fabric layer is provided outward relative to a direction of melt exposure and a thermoplastic fiber layer or mixed thermoplastic-cellulosic layer to create the critical char at the interface between the layers. However, this construction is much harder to achieve as described. In most cases, fabrics are woven fabrics formed from the yarns described. In an inventive embodiment, the blended yarn is used in both the warp and fill direction in the fabric. In some embodiments, only the yarn containing a cellulosic component will be oriented in the warp direction and only the second group of yarns containing the thermoplastic component will be oriented in the fill direction. In this way, the fibers on the face side of the fabric will predominantly include those of the first group of cellulosic yarns and the fibers on the body side of the fabric will predominantly include those of the second group of thermoplastic yarns.

Typical fiber diameters according to the present invention are independent for each of the thermoplastic fiber and cellulosic fiber. It is appreciated that a variety of fiber diameters are readily spun together to form a yarn. Textile fibers are reported in denier (indirect measure of diameter). The denier of fibers used for both cellulosic and thermoplastic is roughly 1.5 denier. In inventive embodiments, the average fiber (based on number average) diameter ratio of the thermoplastic fiber:cellulosic fiber is 1:1, however the ratio may range from 0.8:1 to 1.2:1.

Figure 1D:
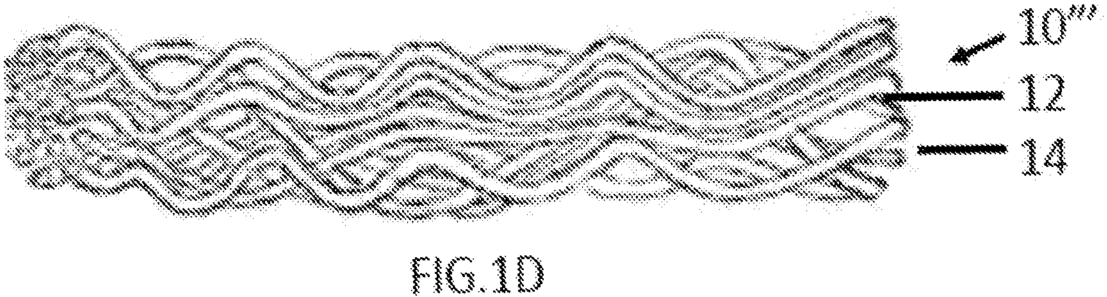
Figure 1E:
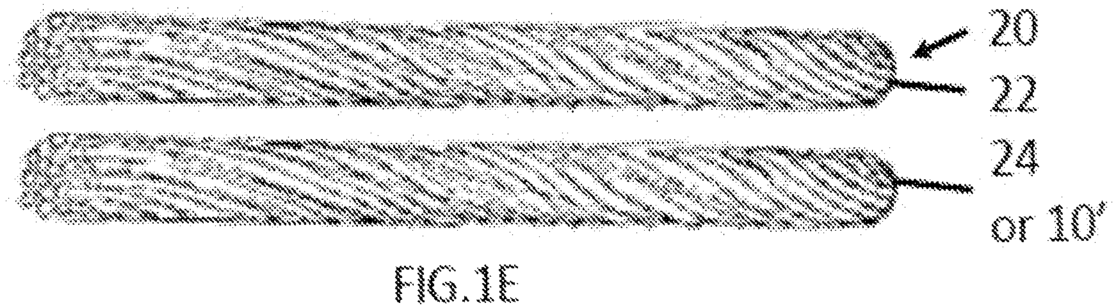

Referring now to the figures, FIGS. 1A-1E show yarn constructs operative in the present invention at 10, 10', 10" and 10''', respectively. Each yarn includes thermoplastic fiber 12 and cellulosic fiber 14. The volume ratio of cellulosic:thermoplastic:content varies between 3:1 (75% cellulosic fiber and 25% thermoplastic fiber), and in some inventive embodiments from 1:1-3:1 (50-75% cellulosic and 25-50% thermoplastic) in a yarn 10, 10', 10" or 10'''. The yarns take the form of untwisted fiber yarn 10 (FIG. 1A), twisted fiber yarn 10' (FIG. 1B), high bulk fiber yarn 10" (FIG. 1C), and stretch fiber yarn 10''' (FIG. 1D). In specific inventive embodiments, both cellulosic and thermoplastic fibers were 1.5 denier in size (size ratio of 1:1). A dual layer fabric is shown in FIG. 1E generally at 20 with an outer layer 22 of cellulosic and an inner layer of thermoplastic fiber alone 24 or a mixed per yarn 10', where the direction of inner and outer being relative to the direction of melt contact.

Stretch fiber yarns may be used to form stretch protective garments such as stretch trousers and shirts that can protect against hazards as described herein. For example, a spandex/lycra core yarn with a blend of cellulosic and thermoplastic fibers (with an adherent char layer) as the wrapper may be used to form a stretchable garment construction.

It is a appreciated that outer layer 22 may also be in the form of a unitary sheet as opposed to a fabric (not shown). In inventive embodiments the inventive fabric is a woven or a knit fabric. The fabric may be constructed with the first and second groups of yarns in a variety of ways, including but not limited to, one or more of twill weave (2×1, 3×1, etc.), satin weave (4×1, 5×1, etc.), sateen weave, and double-cloth constructions, or any other weave where yarn is predominantly more on one side of the fabric than the other side of the fabric. A person skilled in the art would be familiar with and could utilize suitable fabric constructions. Embodiments of the fabric may also be a circular or a jersey knit fabric using the yarns described in the invention.

It is further appreciated that the constructs of FIGS. 1A-1E are readily used in series and of the same fabric or varied types as shown in FIGS. 1A-1E to create a multi-layer fabric that is especially well suited for high temperature or possible prolonged exposure protective clothing.

Embodiments of the inventive protective fabrics may be formed with spun yarns, filament yarns, stretch broken yarns, or combinations thereof. The yarns may include a single yarn or two or more individual yarns that are combined together in some form, including, but not limited to, twisting, plying, tacking, wrapping, covering, core-spinning (i.e., a filament or spun core at least partially surrounded by spun fibers or yarns), etc. Embodiments of fabrics disclosed herein are not laminated, or metallized such that the fibers of the yarns remain exposed on the fabric surfaces, however the fabrics may optionally be coated to alter the surface energy of the fabric.

A fabric is readily formed into a variety of articles of protective wear to protect a volume, the volume readily enclosing a person or equipment. Representative articles of protective wear include an apron, a cape, a sleeve, a bib, a chap, a coat, a coverall, a glove, a hood, a neck guard, pants, a sleeve, spats, and a combination thereof. It is further appreciated that the fabric is readily fashioned as a custom shaped shield or cover for a given piece of equipment.

Figure 2:
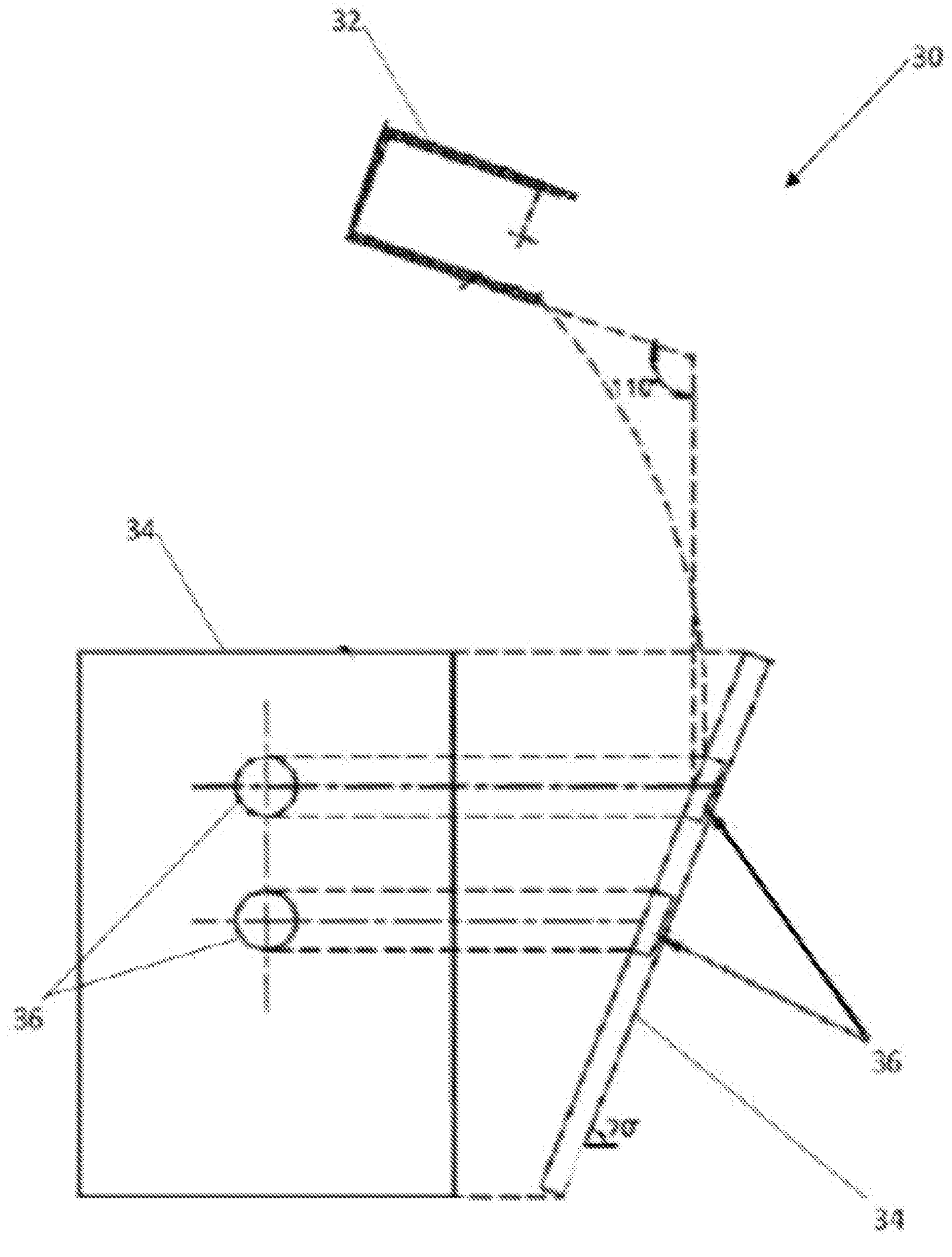
FIG. 2 illustrates a test set up used to evaluate flame resistant fabric in response to exposure to molten metal.
Figure 3A:
FIGS. 3A-3E are a series of photographs for visual grading based on a scale range of levels 1 to 5 of charring of fabrics subjected to impact of molten metal flows for rating various flame resistant fabrics.
Figure 3B:
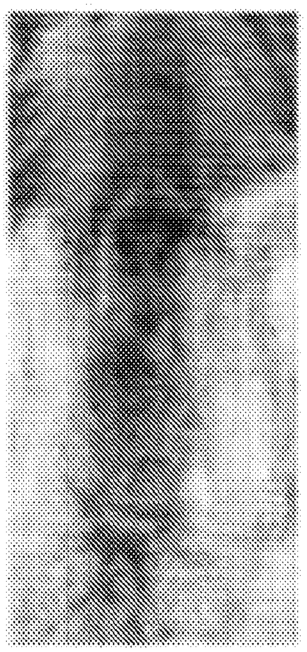
Figure 3C:
Figure 3D:
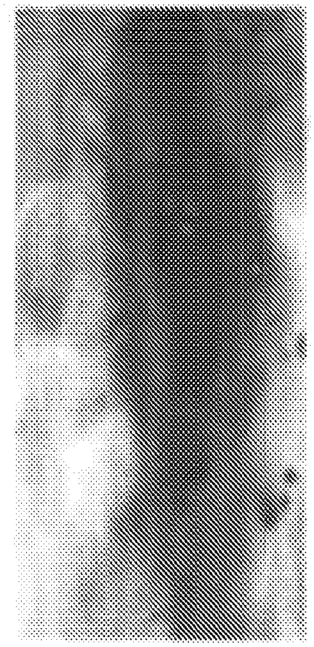
Figure 3E:
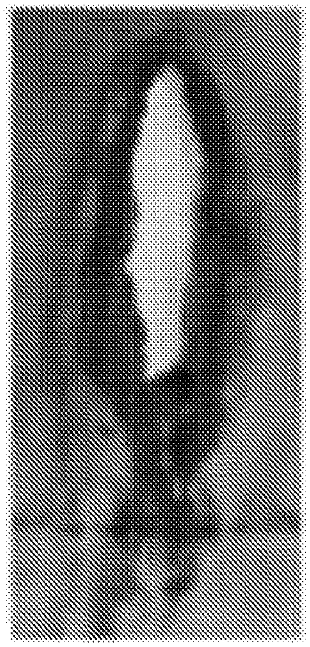
Figure 4A:
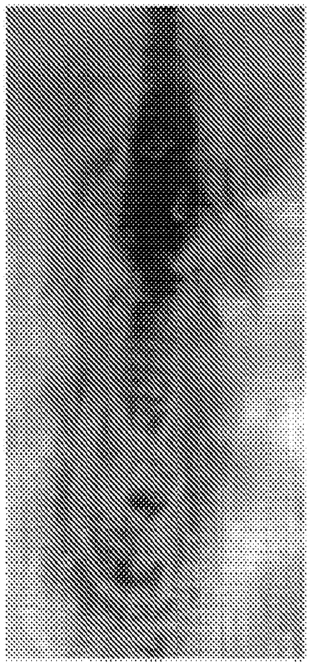
FIGS. 4A-4E are a series of photographs for visual grading based on a scale range of levels 1 to 5 of shrinkage of fabrics subjected to impact of molten metal flows for rating various flame resistant fabrics.
Figure 4B:
Figure 4C:
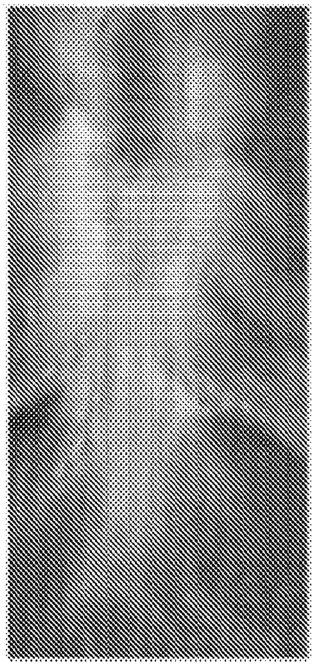
Figure 4D:
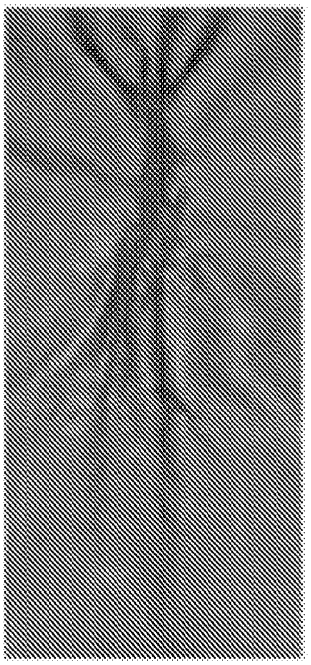
Figure 4E:
Figure 5A:
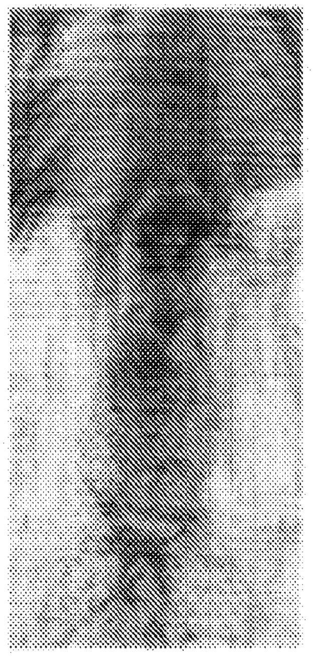
FIGS. 5A-5E are a series of photographs for visual grading based on a scale range of levels 1 to 5 of adherence of molten metal to a fabric of fabrics subjected to impact of molten metal flows for rating various flame resistant fabrics.
Figure 5B:
Figure 5C:
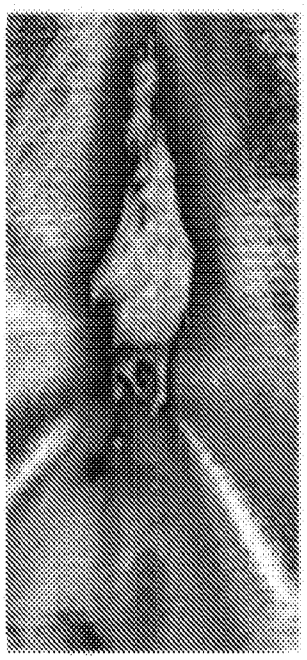
Figure 5D:
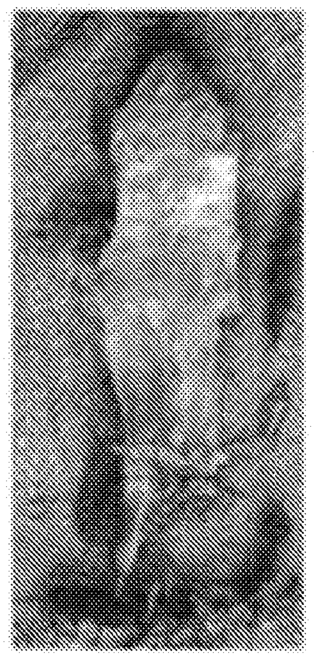
Figure 5E:
Figure 6A:
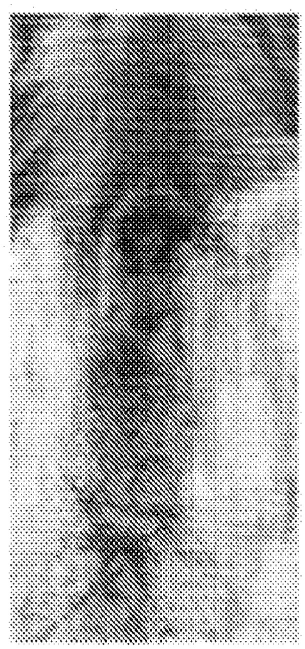
FIGS. 6A-6E are a series of photographs for visual grading based on a scale range of levels 1 to 5 of break out experienced by fabrics subjected to impact of molten metal flows for rating various flame resistant fabrics.
Figure 6B:
Figure 6C:
Figure 6D:
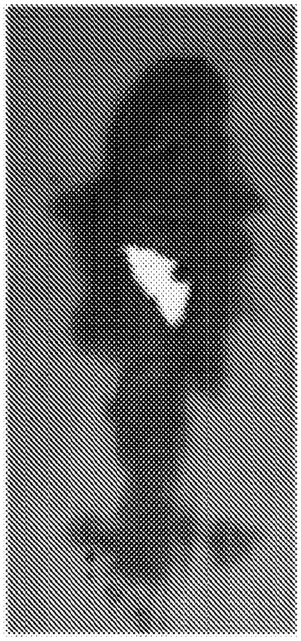
Figure 6E:

FIG. 2 illustrates a test set up 30 used to evaluate flame resistant fabric in response to exposure to molten metal. A pivoting crucible 32 is used to dispense and pour molten metal on a fabric held on a sensor board 34 with one or more sensors 36. As shown the one or more sensors may be copper disk calorimeters that contain a single 30-gauge iron/constantan with Type J thermocouple inserted into the back of the calorimeter.

The test set up as shown in FIG. 2 is configured for performing the procedures of ASTM standard F955-15 entitled "Evaluating Heat Transfer through Materials for Protective Clothing upon Contact with Molten Substances." The standardized conditions for molten aluminum impact evaluations include pouring 1 kg. (2.2 lbs.)±0.1 kg. of molten aluminum at a minimum temperature of 760° C. (1400° F.) onto fabric samples attached to a calorimeter/sensor board 34. The calorimeter/sensor board 34 is oriented at an angle of 70° from the horizontal and molten metal is dropped from a height of 12 inches onto a fabric sample placed over a calorimeter calorimeter/sensor board 34. The crucible 32 containing the molten metal is rotated at a rate of 4.7±0.2 seconds per revolution until a rigid stop is reached, and the metal is dumped onto the test fabric.

The calorimeter/sensor board 34 to which the fabrics are attached may be constructed according to ASTM standard F955-15. The board has two 4 cm (1.57 inch) diameter, 0.158 cm (1/16 inch) thick, copper disks that serve as part of the sensors 36. One copper disk is located under the point of molten metal impact, and the second copper disk is located 4 inches below the first.

Each copper disk calorimeter may have a single 30-gauge iron/constantan Type J thermocouple inserted into the back of the calorimeter. The thermocouple output from the calorimeter may be recorded with a high precision digital data acquisition system. The temperature rise for both calorimeters may be plotted for forty-five seconds for each fabric/metal combination. The total heat energy that flowed through the fabric may be calculated at each time step using the following formula:

$$Q = \frac{m \times C_p \times (Temp_{final} - Temp_{initial})}{\text{Area}}$$

where:

Q=heat energy (J/cm2), m=mass of copper slug (g),

Cp=average heat capacity of copper during the temperature rise (J/g° C.), $Temp_{final}$=final temperature of calorimeter at $time_{final}$ (° C.), $Temp_{initial}$=initial temperature of calorimeter at $time_{initial}$ (° C.), Area=area of copper calorimeter.

This heat energy curve may be compared to an empirical predicted human second-degree skin burn injury model (Stoll Curve). The Stoll curve is calculated from the following formula.

$$\text{Stoll Curve(J/cm2)}=5.0204\times tj^{0.2901.0}$$

where tj is the time after molten metal impact.

During a testing run, each fabric to be evaluated is placed on the calorimeter board 34 and held in place with clips along the upper edge. The preheated crucible ladle 32 is filled with molten aluminum from a resistance heat furnace held at a temperature of approximately 20° C. (68° F.) above the target temperature. The filled crucible ladle 32 is transferred to the ladle holder and metal temperature checked with a thermocouple. The metal weight is determined with an electronic balance and is maintained at 1 kg.±0.1 kg. The metal is poured from the ladle onto the fabric and the results are assessed.

In operation, a melt filled crucible ladle 32 is suspended in an upright position above a test fabric positioned under the pour arc of ladle 32 (not shown).

Figure 8A:
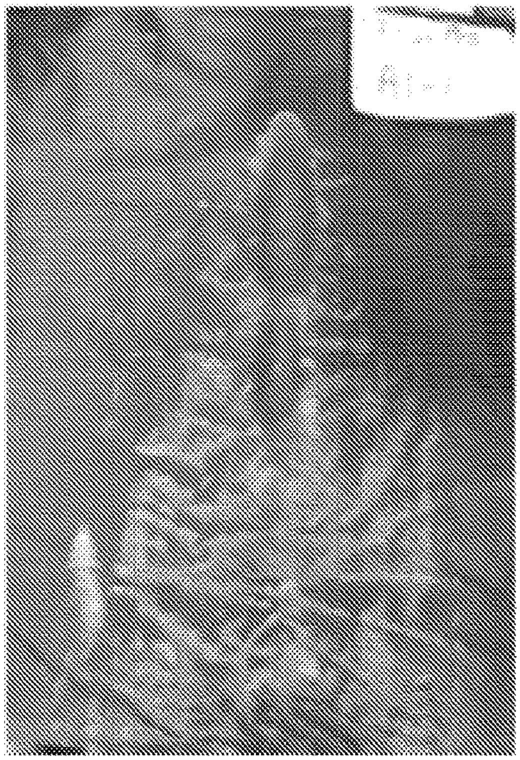
FIGS. 8A and 8B are front and back views, respectively, showing the effect on T-shirt shielded by the inventive flame resistant material with respect to pour 1 of FIG. 6A.
Figure 8B:
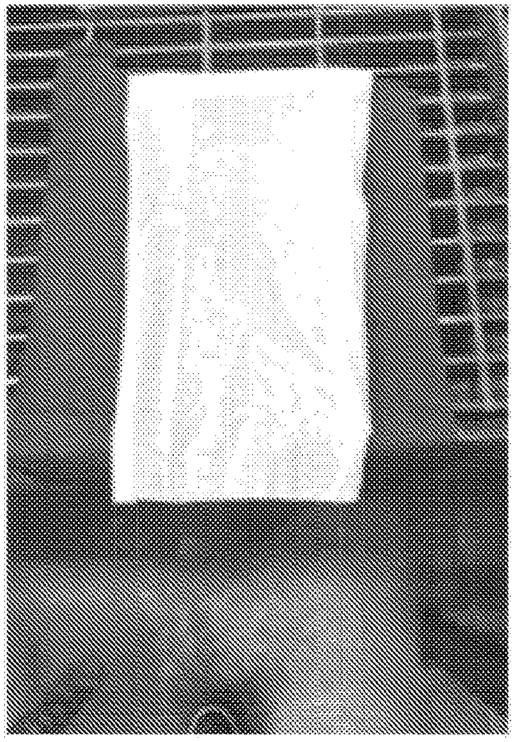

The visual appearance of the front (impact) surface of each experimental fabric tested with only a T-shirt backing (as best shown in FIG. 8B) is subjectively rated in four categories after impact with molten metal. These categories are (1) charring, (2) shrinkage, (3) metal adherence, and (4) break out. The rating system is outlined in Table I. The char rating describes the extent of scorching, charring, or burning sustained by the fabric. The shrinkage rating provides an indication of the extent of the fabric wrinkling caused by shrinkage occurring around the area of metal impact. It is desirable to have a minimum amount of charring, wrinkling, and shrinkage during or after an impact event.

Metal adherence refers to the amount of metal sticking to the fabric, and the break out rating describes the extent of fabric destruction in terms of the size, number of holes created, and penetration of molten metal through the fabric. It is desirable to have no adherence and no breakout or penetration of molten metal through the fabric. The rating system described below uses numbers one through five as levels in each category, with "1" representing the best behavior and "5" representing poor behavior. Representative images of the charring, shrinkage, metal adherence, and break out levels are shown in FIGS. 3-6.

FIGS. 3A-3E are a series of photographs for visual grading based on a scale range of levels 1 to 5, respectively, of charring of fabrics subjected to impact of molten metal flows for rating various flame resistant fabrics. The charring scale is as follows:

1=slight scorching, fabric had small brown areas

2=slight charring, fabric was mostly brown in impacted area

3=moderate charring, fabric was mostly black in impacted area

4=charred, fabric was black and brittle, cracked when bent

5=severely charred, large holes or cracks, very brittle

FIGS. 4A-4E are a series of photographs for visual grading based on a scale range of levels 1 to 5, respectively, of shrinkage of fabrics subjected to impact of molten metal flows for rating various flame resistant fabrics. The shrinkage scale is as follows:

1=no shrinkage

2=slight shrinkage

3=moderate shrinkage

4=significant shrinkage

5=extensive shrinkage

FIGS. 5A-5E are a series of photographs for visual grading based on a scale range of levels 1 to 5, respectively, of adherence of molten metal to a fabric of fabrics subjected to impact of molten metal flows for rating various flame resistant fabrics. The adherence scale is as follows:

1=none

2=small amount of metal adhered to face or back of the fabric

3=a moderate amount of metal adhered to face or back of the fabric

4=substantial adherence of the metal to face or back of the fabric

5=large amount of adherence of metal to face or back of the fabric

FIGS. 6A-6E are a series of photographs for visual grading based on a scale range of levels 1 to 5, respectively, of break out experienced by fabrics subjected to impact of molten metal flows for rating various flame resistant fabrics. The break out scale is as follows:

1=none

2=slight, small holes impacted area

3=moderate, holes in fabric

4=metal penetration through the fabric, some metal retained on the fabric

5=heavy perforation, the fabric exhibited gaping holes or large cracks or substantial metal penetration to the back side The present invention is further detailed with respect to the following examples. These examples are illustrative of specific embodiments of the present invention and not intended to limit the scope of the appended claims.

EXAMPLES

Example 1

Figure 7A:
FIGS. 7A-7C are photographs of three pieces of an embodiment of the inventive flame resistant material, respectively, each piece of fabric subject to a molten aluminum pour.
Figure 7B:
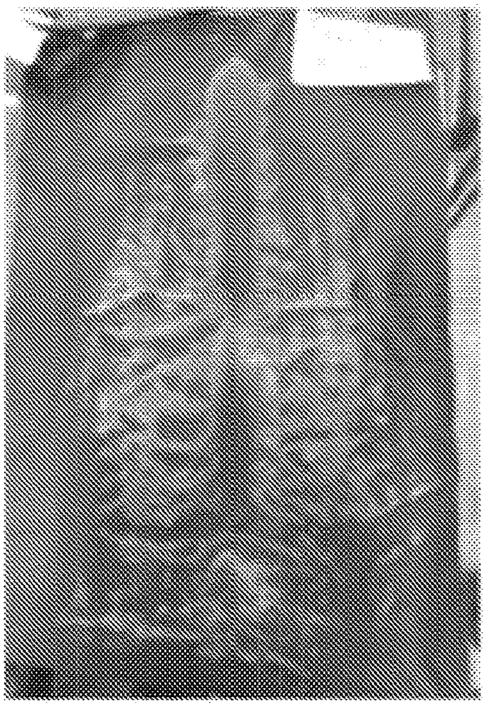
Figure 7C:
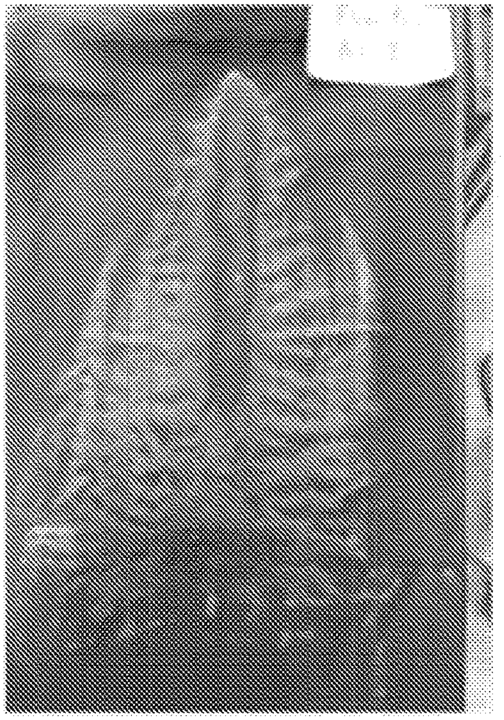

The visual ratings of embodiments of the inventive fire resistant fabric combination were tested with molten aluminum using the test set up of FIG. 2 in accordance with ASTM standard F955-15. Photographs of the fabric after molten aluminum impact are illustrated in FIGS. 7A-7C for three separate pours of molten aluminum. The photographs shown in FIGS. 8A and 8B illustrate both the front and back, respectively, of the fabric combination. As readily seen in FIG. 8B the white T-shirt was not burnt. The inventive fire resistant fabric was moderately charred in the impact area with no shrinkage, adherence, or penetration through the fabric. The inventive fire resistant fabric had no second degree burn indicated in any of the three tests and a maximum temperature increase of about 18° C.

The visual ratings of the Flame Pro™ fabric combination tested with molten aluminum is presented in Table 1.

TABLE 1

Visual rating of fabrics exposed to molten aluminum-rating of outer (impacted) layer

| Fabric Number | Fabric Name | Backing | Charring | Shrinkage | Adherence | Break Out |
|---|---|---|---|---|---|---|
| 1 | Flame Pro™ | T-Shirt | 3 | 1 | 1 | 1 |
| 1 | Flame Pro™ | T-Shirt | 3 | 1 | 1 | 1 |
| 1 | Flame Pro™ | T-Shirt | 3 | 1 | 1 | 1 |

The calorimeter data, including the maximum calorimeter temperature rise within 30 seconds after molten aluminum impact and the time to second degree burn according to the Stoll curve, is given in Table 2.

TABLE 2

Maximum calorimeter temperature rise during the first 30 seconds and time to second degree burn according to the Stoll curve after impact with Molten aluminum

| Fabric Number | Fabric Name | Backing | Temperature Increase Top Calorimeter (° C.) | Temperature Increase Bottom Calorimeter (° C.) | Time to Second Degree Burn (sec) |
|---|---|---|---|---|---|
| 1 | Flame Pro™ | T-Shirt | 17.5 | 18.9 | No Burn |
| 1 | Flame Pro™ | T-Shirt | 15.7 | 13.2 | No Burn |
| 1 | Flame Pro™ | T-Shirt | 17.8 | 18.1 | No Burn |

Example 2

Test to determine effectiveness of embodiments of the inventive fire resistant fabric when the fabric is pre-treated prior to molten metal splash testing. Pre-treatment included washing and drying the fabric. A dry mass of the inventive fire resistant fabric weighing 0.36 Kg was put through five wash cycles at 60° C. with a counterweight mass weighing 1.65 Kg of polyester using a washing powder made of ECE detergent 98, sodium perborate, and TAED. The fabric was tumbled dried.

In a first test iron with a pouring temperature of 780±20° C. was poured at an angle of 60±1 at a pouring height of 225±5 mm. the results are shown in table 3.

TABLE 3

Test results for treated material

| Mass of metal used (g) | Mass of metal pouring (g) | Ignition | Puncture | Metal adhered to fabric | Assessment of PVC film |
|---|---|---|---|---|---|
| 365 | 358 | Yes | Yes | Yes | Damaged |
| 214 | 207 | No | No | No | Not Damaged |
| 214 | 207 | No | No | No | Not Damaged |
| 214 | 207 | No | No | No | Not Damaged |
| 215 | 207 | No | No | No | Not Damaged |

In a second test iron with a pouring temperature of 1400±20° C. was poured at an angle of 75±1 at a pouring height of 225±5 mm. the results are shown in table 4.

TABLE 4

| Test results for treated material | | | | | |
|---|---|---|---|---|---|
| Mass of metal used (g) | Mass of metal pouring (g) | Ignition | Puncture | Metal adhered to fabric | Assessment of PVC film |
| 204 | 204 | No | No | No | Not Damaged |
| 204 | 204 | No | No | No | Not Damaged |
| 204 | 204 | No | No | No | Not Damaged |
| 207 | 207 | No | No | No | Not Damaged |

Example 3

Figure 9:
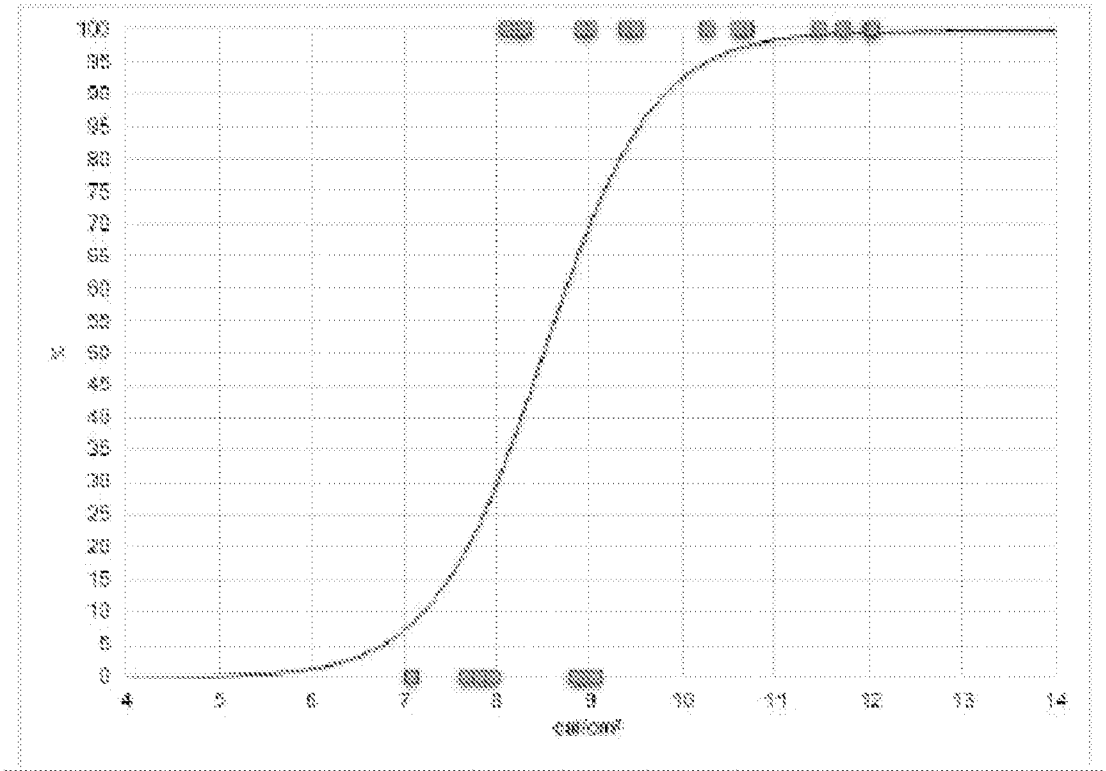
FIG. 9 is a graph showing the Arc Rating (APTV or EBT50 or both), and plots of the burn injury probability (APTV), or break open probability (EBT50)) or both versus Ei for embodiments of the invention.
Figure 10:
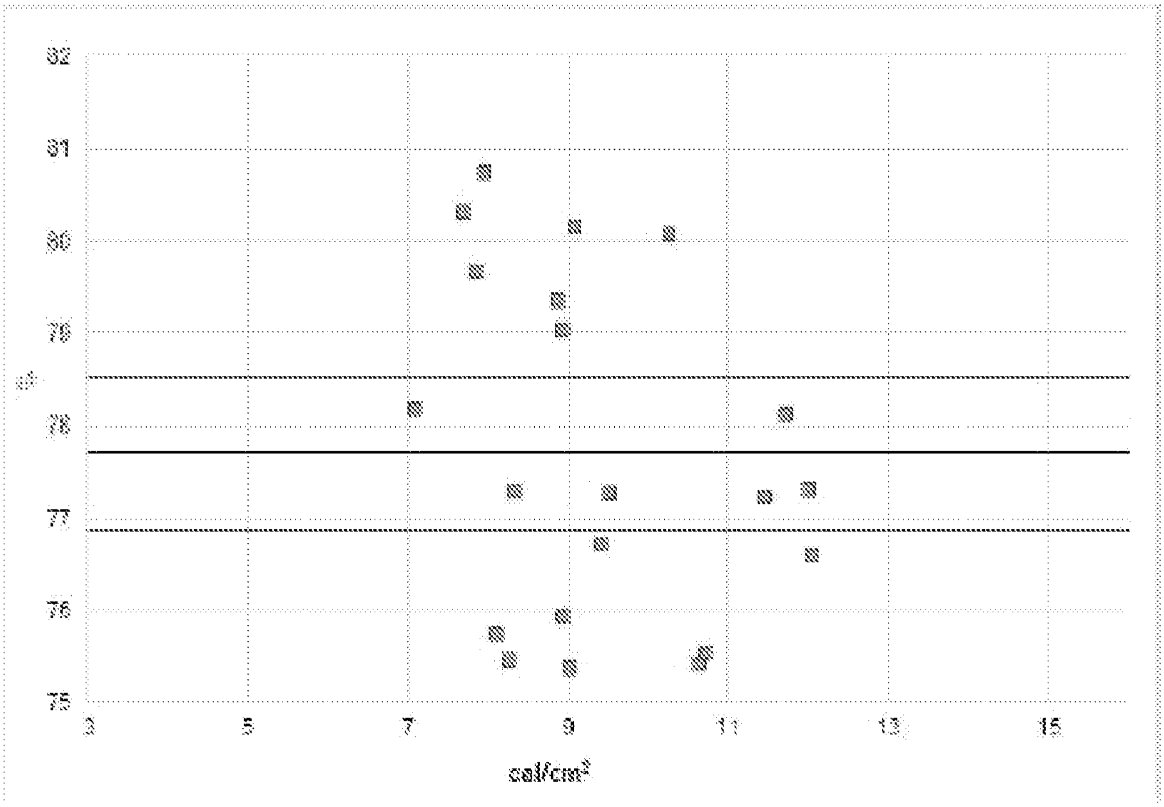
FIG. 10 is a graph showing the Heat Attenuation Factor (HAF) and a plot of the HAF on Ei for embodiments of the invention.

Electric Arc Exposure Test: Determination of the Arc Rating (APTV or $E_{BT50}$) of Flame Resistant Materials for Clothing. Twenty one (21) individual panel are trials were conducted with embodiments of the inventive fire resistant fabric combination in accordance with ASTM standard F1959/F1959M-14. The following test data was recorded for each trial: Arc exposure electrical conditions: arc trial number, RMS arc current, peak arc current, arc voltage, arc duration, energy dissipated in arc, plots of arc current and arc voltage; temperature rise response from two monitor sensors for each panel in each trial, plot of average responses from two monitor sensors, pictures after arc exposure. The graph entitled "Determination of APTV, 50% of Probablility of 2$^{nd}$ degree burn" shown in FIG. 9 shows the Arc rating: APTV or $E_{BT50}$ or both, and plots of the burn injury probability (APTV) or break open probability ($E_{BT50}$) or both versus Ei. The graph shown in FIG. 10 entitled "Determination of HAF, confidence Intervals 95%" shows the heat attenuation factor (HAF) and plot of HAF on Ei.

Table 5 provides a summary of measured energy and subjective evaluation of each individual arc trial panel. As can be readily seen in Table 5, none of the 21 individual panel arc trials experienced break open, and trials 1-C through 2-C, 4-B, 5-B, 5-C, and 6A-7C were not burnt.

TABLE 5

| Summary of measured energy and subjective evaluation | | | | | | | |
|---|---|---|---|---|---|---|---|
| Test | Time (ms) | Cycles 50 Hz | Ei cal/cm$^2$ | SCD cal/cm$^2$ | HAF % | Burn | Break Open |
| 1-A | 193.2 | 9.66 | 10.7 | 0.66 | 75.6 | Y | N |
| 1-B | 193.2 | 9.66 | 10.3 | 0.12 | 80.1 | Y | N |
| 1-C | 193.2 | 9.66 | 8.9 | −0.02 | 79.0 | N | N |
| 2-A | 152.6 | 7.63 | 7.7 | −0.22 | 80.3 | N | N |
| 2-B | 152.6 | 7.63 | 7.1 | −0.25 | 78.2 | N | N |
| 2-C | 152.6 | 7.63 | 8.0 | −0.21 | 80.8 | N | N |
| 3-A | 213.2 | 10.66 | 11.5 | 0.67 | 77.2 | Y | N |
| 3-B | 213.2 | 10.66 | 12.0 | 0.76 | 77.3 | Y | N |
| 3-C | 213.2 | 10.66 | 12.0 | 0.83 | 76.6 | Y | N |
| 4-A | 172.8 | 8.64 | 8.1 | 0.14 | 75.8 | Y | N |
| 4-B | 172.8 | 8.64 | 9.1 | −0.12 | 80.2 | N | N |
| 4-C | 172.8 | 8.64 | 9.0 | 0.35 | 75.4 | Y | N |
| 5-A | 182.8 | 9.14 | 8.2 | 0.2 | 75.5 | Y | N |
| 5-B | 182.8 | 9.14 | 8.8 | −0.09 | 79.4 | N | N |
| 5-C | 182.8 | 9.14 | 7.8 | −0.12 | 79.7 | N | N |
| 6-A | 193.4 | 9.67 | 9.4 | 0.25 | 76.7 | Y | N |
| 6-B | 193.4 | 9.67 | 10.6 | 0.7 | 75.4 | Y | N |
| 6-C | 193.4 | 9.67 | 8.9 | 0.34 | 75.9 | Y | N |
| 7-A | 183 | 9.15 | 9.5 | 0.33 | 77.3 | Y | N |
| 7-B | 183 | 9.15 | 11.7 | 0.75 | 78.1 | Y | N |
| 7-C | 183 | 9.15 | 8.3 | 0.06 | 77.3 | Y | N |

The Electric Arc Exposure Test determined that the inventive fire resistant fabric tested according to ASTM standard F1959/F1959M-14 has an Arc rating (ATPV) of 8.5 cal/cm$^2$ and an Arc Flash Personal Protective Equipment (PPE) category rating of 2 (minimum arc rating of 8 cal/cm$^2$) according to standard NFPA70E Edition 2015 Table 130.7 (C)(16)—Personal Protective Equipment (PPE).

Example 4

A Ne. 28/2 yarn was spun using a standard ring-spinning machine using a blend containing 75% FR rayon fibers from Lenzing (1.5 denier) and 25% FR nylon fibers from Nexylon (1.5 denier). A woven fabric was produced using the above yarn in both the warp and weft direction, and the areal weight of the woven fabric was 290 gram/m$^2$. The construction of the woven fabric was a ¼ sateen weave (36 warp/cm×24 weft/cm). After dyeing and finishing the fabric, the weight of the fabric increased to 305 gram/m. A fluorocarbon finish, Rucostar TEE6 from Rudolf duraner, was applied to the fabric during the finishing process to alter the surface energy of the fabric to improve the shedding properties to molten metal. Table 6 shows the properties of the woven fabric formed with the Ne. 28/2 yarn.

TABLE 6

| Test results for the woven material formed with Ne. 28/2 yarn. | | |
|---|---|---|
| Nature of test | Methodology | Woven article |
| Abrasion Resistance | EN ISO 12947-2:2016 | 100000 |
| Pilling Resistance | ISO 12945-2:2000 | 5000 rev 4<br>2000 rev 4 |
| Pilling Resistance | ASTM D 3512<br>(30, 60, 90, 120 min) | 30 min 4-5B<br>60 min 4F<br>90 min 4F<br>120 imn 4F |
| Dimensional Stability | ISO 3759:2011 | +/−3% |
| Dimensional Stability | AATCC 135 | +/−3% |
| Color Fastness to light | ISO 105B (grade 5) | 5 |
| Color Fastness to XENON light | AATCC16 | 3, 5 |
| Color Fastness to rubbing | ISO 105-x12:2016 | dry: 4-5<br>wet: 4 |
| Crocking | AATCC8 (wet&dry) | dry 4, 5<br>wet 4 |
| Color fastness to washing | ISO 105-C06:2010 | 4-5 |
| Color fastness to perspiration | EN ISO 105-E04:1996 | 4-5 |
| Tensile Strength | ISO 13934-1:2013 | warp: 1200 N<br>weft: 750 N |
| Tear Strength | ISO 13937-1:2000 | warp: 38 N<br>weft: 32 N |

As a person skilled in the art will recognize from the previous detailed description and from the figures and claims, modifications and changes can be made to the preferred embodiments of the invention without departing from the scope of this invention defined in the following claims.

The invention claimed is:

1. A protective fabric resistant to molten metal splash, the fabric comprising: a combination of cellulosic fibers and thermoplastic fibers in a yarn that include both the cellulosic fibers and the thermoplastic fibers in both the warp and fill directions where upon contact with a molten metal, the cellulose fibers are configured to char with kinetic rapidity relative to the thermoplastic fibers to generate a flexible, non-brittle and adherent char layer that deposits on proximal thermoplastic fibers to protect the thermoplastic fibers, the adherent char layer adapted to alter the surface energy of the fabric to minimize contact time with the molten metal to shed the molten metal wherein the thermoplastic fibers are present from more than 30 to 50 volume percent.

2. The fabric of claim 1 wherein the thermoplastic fiber and the cellulosic fiber are in direct contact between adjacent fibers thereof or the thermoplastic fiber and the cellulosic fiber are separated by a distance of 1 to 3 fiber diameters therebetween.

3. The fabric of claim 1 wherein the thermoplastic fiber and the cellulosic fiber are spun together to form a yarn woven into the form of the fabric.

4. The fabric of claim 1 wherein the fabric is devoid of wool.

5. The fabric of claim 1 wherein the cellulosic fibers are formed of at least one of cotton, linen, rayon, bamboo, hemp, sisal, jute, or a cellulose ether reaction product of any of the aforementioned.

6. The fabric of claim 5 wherein the cellulose ether reaction product is one of methylcellulose, hydroxypropylmethylcellulose, hydroxyethylcellulose, or carboxymethylcellulose (CMC).

7. The fabric of claim 1 wherein the thermoplastic fiber and the cellulosic fiber are present in adjacent layers.

8. The fabric of claim 7 wherein the cellulosic fiber is in an outer layer of the adjacent layers as measured by being the layer first contacted by the molten metal.

9. The fabric of claim 1 wherein the thermoplastic fiber and the cellulosic fiber independently have fiber diameters of 1.5 denier.

10. The fabric of claim 1 wherein a number average fiber diameter ratio of the thermoplastic fiber to the cellulosic fiber is between 0.8:1 to 1.2:1.

11. A process of protecting a volume from a melt comprising:

forming an article from a fabric of claim 1; and exposing the article to a melt, an electric arc, or a combination thereof to form an adherent char on an outer surface of the article.

12. The process of claim 11 wherein the volume defines equipment and the article is a shield or cover.

13. The process of claim 11 wherein the outer surface is enriched in cellulosics relative to an inner surface.

14. The process of claim 11 wherein the melt is molten glass or molten rock.

15. The process of claim 11 further comprising inverting the article to form an inverted article and then exposing the inverted article to a melt, an electric arc, or a combination thereof.

16. The process of claim 11 wherein the article is one of an apron, a cape, a sleeve, a bib, a chap, a coat, a coverall, a glove, a hood, a neck guard, pants, a sleeve, or spats.

17. The process of claim 11 wherein the article has an arc rating of at least 8.5 $cal/cm^2$ and an arc flash personal protection equipment category rating of 2 per standard NFPA70E Edition 2015 Table 130.7(C)(16).

18. The process of claim 11 wherein the melt is molten metal.

19. The process of claim 18 wherein the molten metal is iron or aluminum.

* * * * *